(12) United States Patent
Kim et al.

(10) Patent No.: US 8,573,606 B1
(45) Date of Patent: Nov. 5, 2013

(54) SHOCK ABSORBER FOR VEHICLE

(71) Applicant: Hyundai Motor Company, Seoul (KR)

(72) Inventors: Bo Min Kim, Seoul (KR); Sung Bae Jang, Suwon-si (KR); Jong Min Kim, Seoul (KR); Jae San Kim, Yongin-si (KR); Dae Sik Ko, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/710,292

(22) Filed: Dec. 10, 2012

(51) Int. Cl.
*B60G 17/00* (2006.01)

(52) U.S. Cl.
USPC ............... 280/6.157; 267/64.17; 280/124.157

(58) Field of Classification Search
USPC .................. 280/6.157, 124.159, 124.157; 267/64.17; 188/282.1, 282.7, 282.8, 188/313, 314, 322.13, 322.14
See application file for complete search history.

(56) References Cited

U.S. PATENT DOCUMENTS

| | | | | |
|---|---|---|---|---|
| 2,107,494 | A * | 2/1938 | Onions et al. | 267/64.26 |
| 2,909,368 | A * | 10/1959 | Taylor | 267/64.13 |
| 3,391,921 | A * | 7/1968 | Axthammer | 267/64.17 |
| 3,747,913 | A * | 7/1973 | Savery | 267/64.28 |
| 4,798,398 | A * | 1/1989 | Cummins | 280/124.159 |
| 5,464,079 | A * | 11/1995 | Lohberg et al. | 188/315 |
| 5,988,655 | A * | 11/1999 | Sakai et al. | 280/6.159 |
| 7,422,199 | B2 * | 9/2008 | Beck et al. | 267/64.17 |
| 8,074,974 | B2 * | 12/2011 | Nogami et al. | 267/64.17 |
| 8,146,721 | B2 * | 4/2012 | Kim | 188/322.14 |

FOREIGN PATENT DOCUMENTS

KR   10-2009-0095162 A   9/2009

* cited by examiner

*Primary Examiner* — Joseph Rocca
*Assistant Examiner* — Robert A Coker
(74) *Attorney, Agent, or Firm* — Morgan, Lewis & Bockius LLP

(57) ABSTRACT

A shock absorber apparatus for a vehicle may include a piston installed within a cylinder to be moved along a lengthwise direction of the cylinder and separating the cylinder into an upper chamber and a lower chamber, a piston rod installed to pass through the cylinder and connected to the piston, wherein the piston rod has an oil flow space therein, and a valve mechanism installed on the piston rod and operated to be opened and closed to selectively connect the upper chamber of the cylinder and the oil flow space of the piston rod.

9 Claims, 10 Drawing Sheets

SHOCK ABSORBER FOR VEHICLE

CROSS-REFERENCE TO RELATED APPLICATION

The present application claims priority to Korean Patent Application No. 10-2012-0054144 filed May 22, 2012 the entire contents of which is incorporated herein for all purposes by this reference.

BACKGROUND OF THE INVENTION

1. Field of the Invention

The present invention relates to a shock absorber for a vehicle, and more particularly, to a monotube-type shock absorber for a vehicle which can adjust a height of the vehicle.

2. Description of Related Art

A shock absorber configuring a suspension of a vehicle is an apparatus installed between an axle and a body of the vehicle to absorb vibrations and impacts received by the axle from a road surface while the vehicle is driven and improve riding quality, and serves to provide driving stability and comfortable ride.

Manual shock absorbers widely used conventionally have been developed with only improvement of riding quality and adjustment stability being focused, and accordingly, it is impossible to stably control vehicle postures varying during a travel of the vehicle.

In order to supplement this shortcoming, vehicle height controlled shock absorbers have been developed, and the vehicle height controlled shock absorbers generate damping forces by using hydraulic pressures. Further, the vehicle height controlled shock absorbers additionally function to not only absorb vibrations to improve riding quality and adjustment stability and but also always maintain a height of a vehicle varying during a travel of the vehicle constantly and stably.

FIG. 1 illustrates a shock absorber according to the related art which can adjust a height of a vehicle, and the shock absorber includes a twin tube-type cylinder 1 having an inner tube 1a and an outer tube 1b, a piston 2 installed within the inner tube 1a to reciprocally move along a lengthwise direction of the inner tube 1a, a piston rod one end of which is connected to the piston 2 and an opposite end of which passes through the cylinder 1, an oil pump 4 for generating a hydraulic pressure, and a reserve tank 5 for storing an oil.

Further, a spring valve 6 for connecting the outer tube 1b and the inner tube 1a is installed on a bottom surface of the inner tube 1a, a damping force valve 7 is installed in the piston 2, an leveling valve 9 is installed at an end of an oil passage 8 connecting the inner tube 1a and the reserve tank 5. In addition, a valve hole (not shown) through which an oil can flow is formed in the leveling valve 9, and a piston hole 2a connecting the inner 1a and an interior space of the piston 3 is formed in the piston 2.

An oil is filled in a space between the inner tube 1a and the outer tube 1b, an inner space of the inner tube 1a, and an inner space of the piston rod 2.

The state of FIG. 1A is an initial state where neither a bump nor a rebound situation occurs, in which state the spring valve 6 is opened and the leveling valve 9 is closed. Then, the oil in the inner tube 1a absorbs impacts and vibrations while smoothly flowing through the piston hole 2a, and valve holes formed in the spring valve 6, the damping force valve 7, and the leveling valve 9.

The state of FIG. 1B is a state where a height of the vehicle is raised, in which state, accordingly, the oil in the reserve tank 5 is introduced into interior spaces of the inner tube 1a and the piston rod 3 through an operation of the oil pump 4. Then, the spring valve 6 is closed and the leveling valve 9 is opened, so that the above-described height raised state is maintained by the rebound side shock absorber during a straight travel of the vehicle and by the outer turn wheel side shock absorber during a turn of the vehicle The state of FIG. 1C is a state where a height of the vehicle is lowered, in which state the oil in the inner tube 1a is withdrawn into the reserve tank 5 and accordingly, the piston 2 is lowered. Then, the spring valve 6 is opened and the leveling valve 9 is closed, in which case the bump side shock absorber and the inner turn wheel side shock absorber maintains a state where a height of the vehicle is lowered during a straight travel of the vehicle.

However, the shock absorber according to the related art is a twin tube-type shock absorber including a cylinder 1 having an inner tube 1a and an outer tube 1b, but the twin tube-type shock absorber needs to be small-sized. In particular, since a sufficient installing space needs to be secured, the twin tube-type shock absorber is disadvantageous in the layout of the vehicle.

In addition, according to the twin tube-type shock absorber according to the related art, a separate valve (spring valve) needs to be installed to interrupt a passage between the inner tube 1a and the outer tube 1b, which makes the structure of the shock absorber complex and increases manufacturing costs.

The items described as the related art are just to help understanding of the background of the present invention, and shall not be construed to admit that they belong to the related art well known to those skilled in the art to which the present invention pertains.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a shock absorber for a vehicle which can adjust a height of the vehicle by using a monotube-type cylinder, which is advantageous in a layout of the vehicle according to reduction of weight due to reduction of size, reduction of manufacturing costs, and securing installing space, in particular, which can eliminate an unnecessary valve component.

In an aspect of the present invention, a shock absorber apparatus for a vehicle, may include a piston installed within a cylinder to be moved along a lengthwise direction of the cylinder and separating the cylinder into an upper chamber and a lower chamber, a piston rod installed to pass through the cylinder and connected to the piston, wherein the piston rod may have an oil flow space therein, and a valve mechanism installed on the piston rod and operated to be opened and closed to selectively connect the upper chamber of the cylinder and the oil flow space of the piston rod.

The cylinder is a monotube-type cylinder.

The shock absorber apparatus may further include a support chamber formed under the lower chamber of the cylinder by a partition wall and fluid-connected to the lower chamber through an oil passage formed to the partition wall, a high-pressure gas chamber formed within the support chamber and partitioned from the support chamber by a diaphragm, and a pipe member passing through the piston and installed to fluid-connect the oil flow space of the piston rod and the support chamber.

The shock absorber apparatus may further include an oil pump for generating a hydraulic pressure, an accumulator storing an oil and installed to be connected to the oil pump via a connecting pipe line, a solenoid valve including a spool selectively slid in accordance with a controller, a supply pipe line connecting the oil pump and the solenoid valve, a first return pipe line and a second return pipe line connecting the accumulator and the solenoid valve, and a first valve pipe line connecting the upper chamber of the cylinder and the solenoid valve and a second valve pipe line connecting the lower chamber of the cylinder and the solenoid valve, wherein the first valve pipe line or the second valve pipe line is selectively connected to the oil pump or the accumulator by the movement of the spool.

The valve mechanism may include a pressure-type relief valve installed on the piston rod and operated to open a first rod passage formed to the piston rod to fluid-connect the upper chamber of the cylinder and the oil flow space of the piston rod when a bump occurs while a height of the vehicle is raised in a situation where a hydraulic pressure is supplied to the lower chamber of the cylinder, and a pressure-type check valve installed on the piston rod and operated to open a second rod passage to connect the upper chamber of the cylinder and the oil flow space of the piston rod when a rebound occurs while a height of the vehicle is lowered in a situation where a hydraulic pressure is supplied to the upper chamber of the cylinder.

The pressure-type relief valve may include a relief valve housing connected to the piston rod to protrude toward the upper chamber, and having a relief valve passage fluid-connected to the upper chamber, a relief valve member located within the relief valve housing to open and close the first rod passage, and a relief valve spring installed such that one end thereof is supported by the relief valve housing and an opposite end thereof is supported by the relief valve member and configured to provide a resilient force to the relief valve member such that the relief valve member is elastically biased to close the first rod passage.

The pressure-type check valve may include a check valve housing connected to the piston rod to protrude toward the upper chamber, and having a check valve passage fluid-connected to the upper chamber, a check valve member located within the oil flow space of the piston rod to open and close the second rod passage, and a check valve spring installed such that one end thereof is supported by the check valve housing and an opposite end thereof is supported by the check valve member and configured to provide a resilient force to the check valve member such that the check valve member is elastically biased to close the second rod passage.

A resilient force of the relief valve spring applied to the relief valve member in a situation where the relief valve member closes the first rod passage is larger than an oil pressure applied from the oil flow space to the relief valve member in a situation where a hydraulic pressure is not supplied to the cylinder and an oil pressure applied from the oil flow space to the relief valve member when a height of the vehicle is raised in a situation where a hydraulic pressure is supplied to the lower chamber of the cylinder, and is smaller than an oil pressure applied from the oil flow space to the relief valve member when a bump occurs while a height of the vehicle is raised in a situation where a hydraulic pressure is supplied to the lower chamber of the cylinder.

A resilient force of the check valve spring applied to the check valve member in a situation where the check valve member closes the second rod passage is larger than an oil pressure applied to the check valve member within the check valve housing in a situation where a hydraulic pressure is not supplied to the cylinder and an oil pressure applied to the check valve member within the check valve housing when a height of the vehicle is lowered in a situation where a hydraulic pressure is supplied to the upper chamber of the cylinder, and is smaller than an oil pressure applied to the check valve member within the check valve housing when a rebound occurs while a height of the vehicle is lowered in a situation where a hydraulic pressure is supplied to the upper chamber of the cylinder.

The shock absorber apparatus of claim 1, wherein an orifice is installed in the piston.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
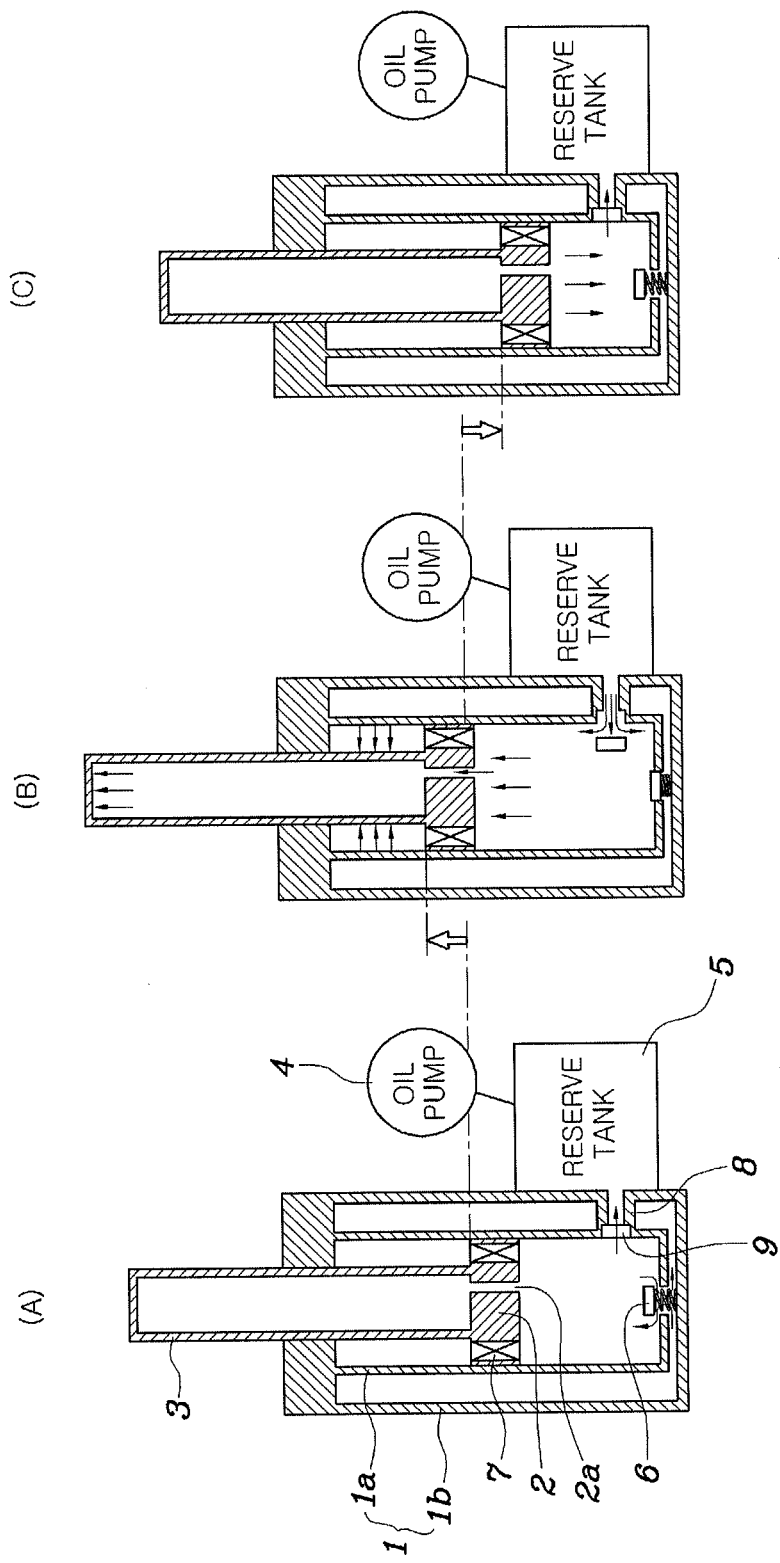
FIG. 1 is a view of a twin tube-type shock absorber according to the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a shock absorber for a vehicle to an exemplary embodiment of the present invention will be described with reference to the accompanying drawings.

Figure 2:
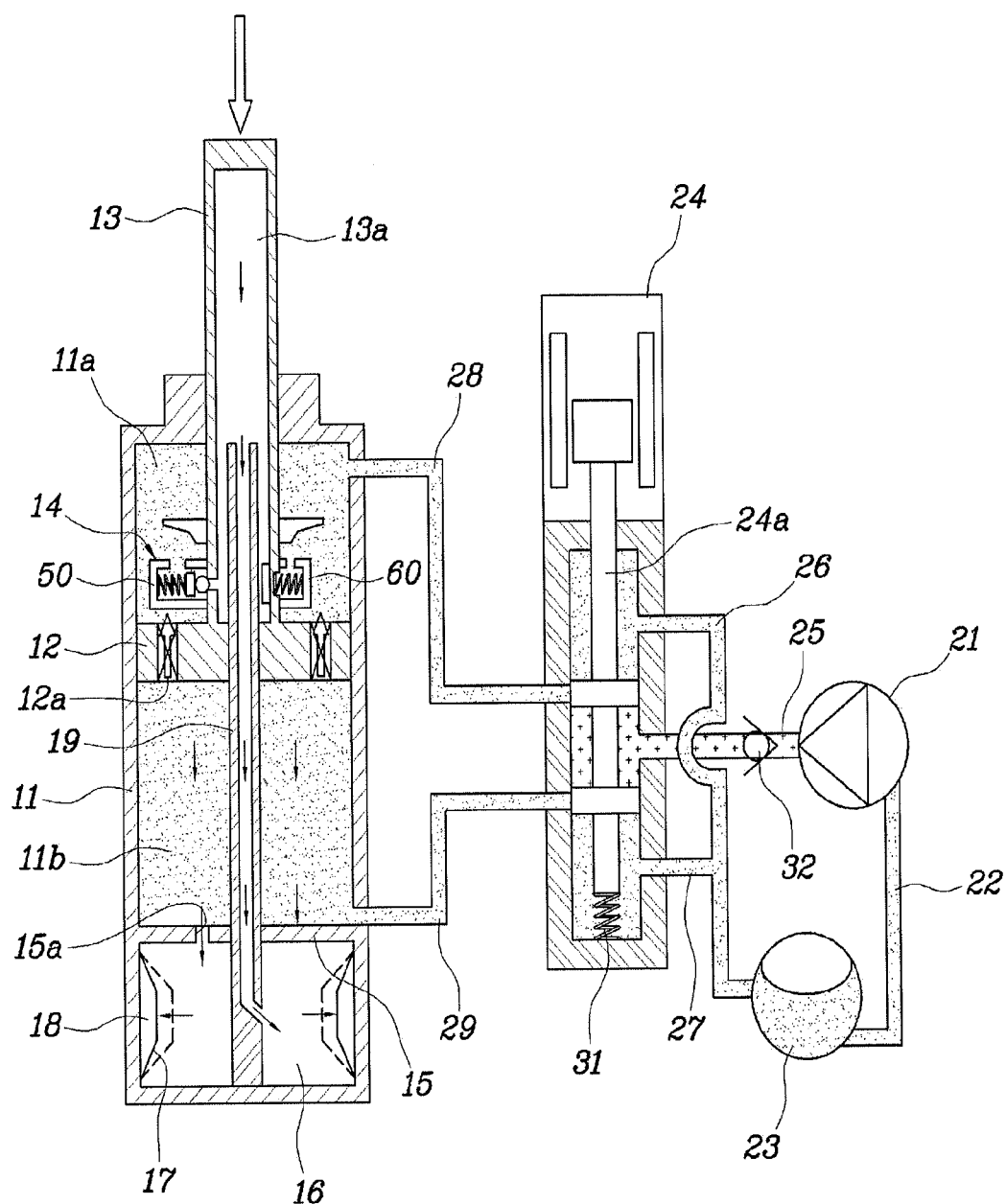
FIG. 2 is a view of a monotube shock absorber capable of adjusting a height of a vehicle according to an exemplary embodiment of the present invention, wherein a piston rod is contracted during a normal situation where a height of the vehicle is neither raised nor lowered.
Figure 3:
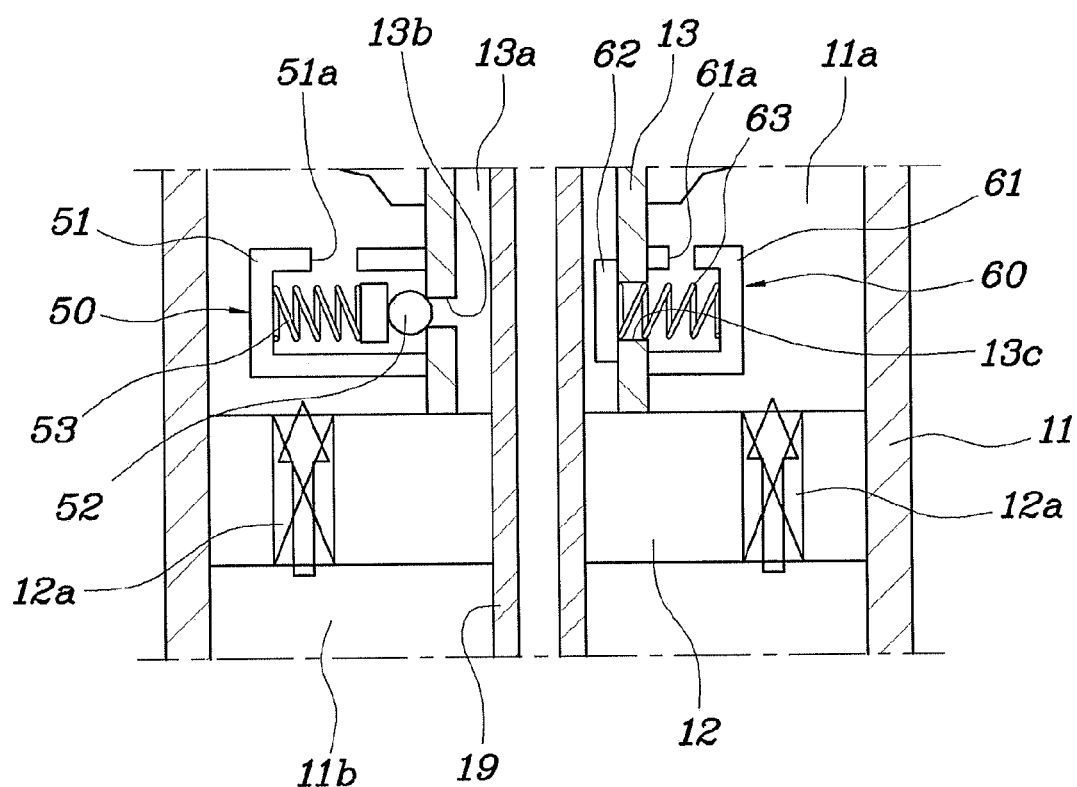
FIG. 3 is an enlarged view of a portion of FIG. 2 to which a valve mechanism is mounted.

As shown in FIGS. 2 and 3, the shock absorber according to an exemplary embodiment of the present invention includes a monotube-type cylinder 11, a piston 12 installed within the cylinder 11 to move along a lengthwise direction of the cylinder 11 and having an orifice 12a passing through upper and lower surfaces thereof, a piston rod 13 installed to pass through the cylinder 11 so as to be connected to the piston 12 and having an oil flow space 13a, a valve mechanism 14 installed in the piston rod 13 and operated to be opened and closed to selectively connect an upper chamber 11a of the cylinder 11 and the oil flow space 13a of the piston rod 13 according to a pressure change of the piston rod 13, a support chamber 16 partitioned from the lower chamber 11b of the cylinder 11 by a partition wall 15 and formed to be connected to the lower chamber 11b through an oil passage 15a, a high-pressure gas chamber 18 formed in the support chamber 16 to be partitioned from the support chamber 16 by means of a diaphragm 17, and a pipe member 19 installed to connect the oil flow space 13a of the piston rod 13 and the high-pressure gas chamber 18.

The shock absorber according to an exemplary embodiment of the present invention further includes an oil pump 21 operated under the control of a controller to generate a hydraulic pressure, an accumulator 23 storing an oil and installed to be connected to the oil pump 21 via a connecting pipe line 22, a supply pipe line 25 connecting the oil pump 21 and the solenoid valve 24, a first return pipe line 26 and a second return pipe line 27 connecting the accumulator 23 and the solenoid valve 24, a first valve pipe line 28 connecting the upper chamber 11a of the cylinder 11 and the solenoid valve 24 and a second valve pipe line 29 connecting the lower chamber 11b of the cylinder 11 and the solenoid valve 24.

Here, the solenoid valve 24 includes a solenoid valve spring 31 for endowing movement of a spool 24a with a resilient force, and a check valve 32 is installed in the supply pipe line 25 to prevent an oil from reversely flowing from the solenoid valve 24 to the oil pump 21.

Meanwhile, the valve mechanism 14 includes: a pressure-type relief valve 50 installed in a first rod passage 13b passing through the piston rod 13 and operated to be opened to connect the upper chamber 11a of the cylinder 11 and the oil flow space 13a of the piston rod 13 only when a bump occurs while a height of the vehicle is raised in a situation where a hydraulic pressure is supplied to the lower chamber 11b of the cylinder, and a pressure-type check valve 60 installed in a second rod passage 13c passing through the piston rod 13 and operated to be opened to connect the upper chamber 11a of the cylinder 11 and the oil flow space 13a of the piston rod 13 only when a rebound occurs while a height of the vehicle is lowered in a situation where a hydraulic pressure is supplied to the upper chamber 11a of the cylinder 11.

The pressure-type relief valve 50 includes a relief valve housing 51 connected to the first rod passage 13b, fixedly installed in the piston rod 13 to protrude toward the upper chamber 11a, and having a relief valve passage 51a connected to the upper chamber 11a, a relief valve member 52 located within the relief valve housing 51 to open and close the first rod passage 13b, and a relief valve spring 53 installed such that one end thereof is supported by the relief valve housing 51 and an opposite end thereof is supported by the relief valve member 52 and configured to provide a resilient force to the relief valve member 52 for the relief valve member 52 to close the first rod passage 13b.

Here, a resilient force of the relief valve spring 53 applied to the relief valve member 52 in a situation where the relief valve member 52 closes the first rod passage 13b is larger than an oil pressure applied from the oil flow space 13a to the relief valve member 52 in a situation where a hydraulic pressure is not supplied to the cylinder 11 and an oil pressure applied from the oil flow space 13a to the relief valve member 52 when a height of the vehicle is raised in a situation where a hydraulic pressure is supplied to the lower chamber 11b of the cylinder 11, and is smaller than an oil pressure applied from the oil flow space 13a to the relief valve member 52 when a bump occurs while a height of the vehicle is raised in a situation where a hydraulic pressure is supplied to the lower chamber 11b of the cylinder 11.

The pressure-type check valve 60 includes a check valve housing 61 connected to the second rod passage 13c, fixedly installed in the piston rod 13 to protrude toward the upper chamber 11a, and having a check valve passage 61a connected to the upper chamber 11a, a check valve member 62 located within the oil flow space 13a of the piston rod 13 to open and close the second rod passage 13c, and a check valve spring 63 installed such that one end thereof is supported by the check valve housing 61 and an opposite end thereof is supported by the check valve member 62 and configured to provide a resilient force to the check valve member 62 for the check valve member 62 to close the second rod passage 13c.

Here, a resilient force of the check valve spring 63 applied to the check valve member 62 in a situation where the check valve member 62 closes the second rod passage 13c is larger than an oil pressure applied to the check valve member 62 within the check valve housing 61 in a situation where a hydraulic pressure is not supplied to the cylinder 11 and an oil pressure applied to the check valve member 62 within the check valve housing 61 when a height of the vehicle is lowered in a situation where a hydraulic pressure is supplied to the upper chamber of the cylinder 11, and is smaller than an oil pressure applied to the check valve member 62 within the check valve housing 61 when a rebound occurs while a height of the vehicle is lowered in a situation where a hydraulic pressure is supplied to the upper chamber 11a of the cylinder 11.

Hereinafter, an operation of the shock absorber according to an exemplary embodiment of the present invention will be described.

Figure 4:
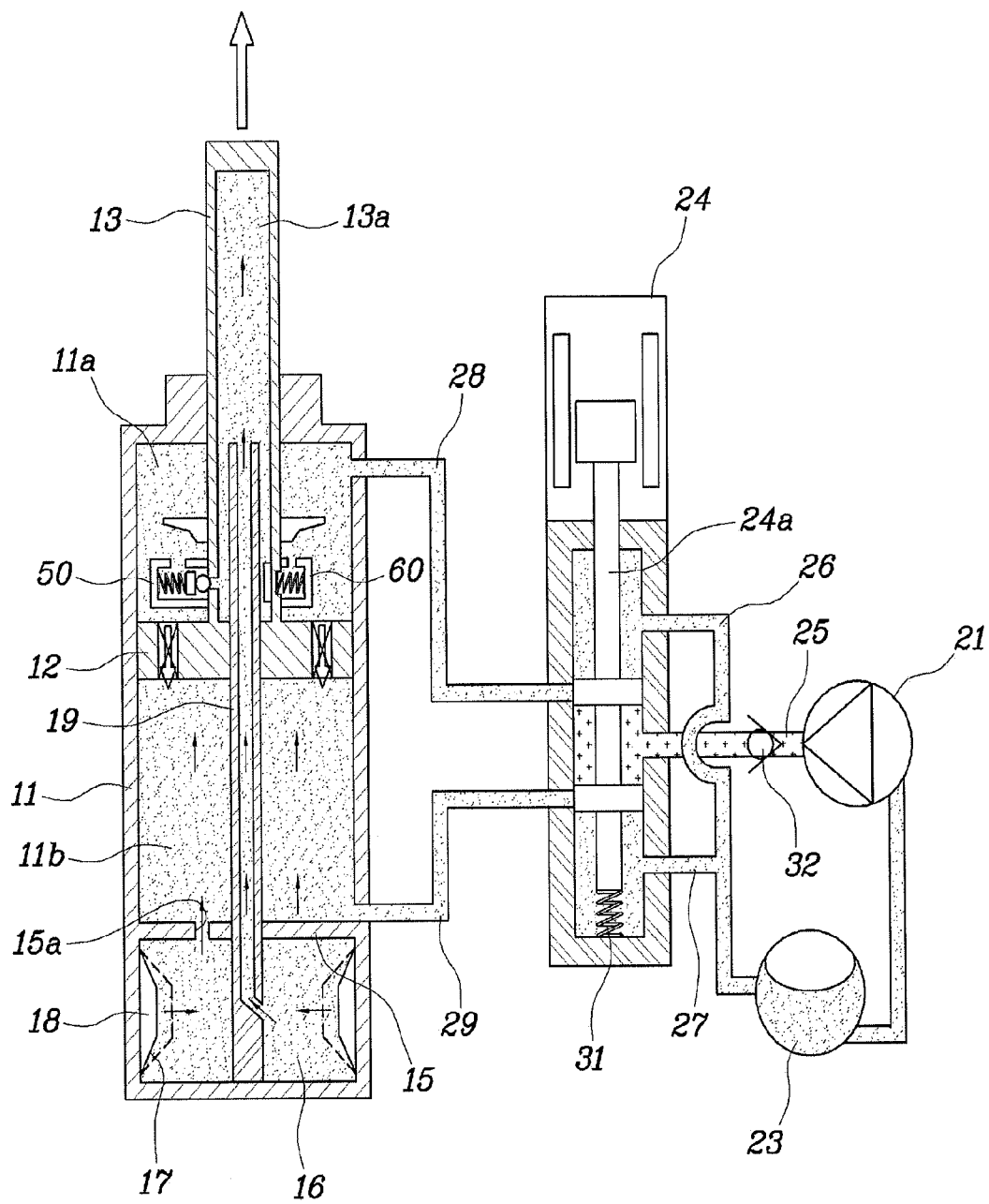
FIG. 4 is a view of a state where the piston rod is expanded in a normal situation where a height of the vehicle is neither raised nor lowered.

FIGS. 2 and 4 illustrate a normal state where a height of the vehicle is neither raised nor lowered, and FIG. 2 illustrates a state where the piston rod is contracted and FIG. 4 illustrates a state where the piston rod is expanded.

At this time, since the oil pump 21 is not operated and the spool 24a of the solenoid valve 24 blocks the first and second valve pipe lines 28 and 29, an oil is not supplied to the cylinder 11 and the pressure-type relief valve 50 and the pressure-type check valve 60 keep blocking the first and second rod passages 13b and 13c, respectively.

When the piston rod 13 is contracted as in FIG. 2, as a volume of the lower chamber 11b is reduced, the oil in the oil flow space 13a flows into the support chamber 16 through a pipe member 19 and the oil in the lower chamber 11b flows into the support chamber 16 through an oil passage 15a of the partition 15 at the same time. Accordingly, a pressure in the support chamber 16 increases and a pressure in the high-pressure gas chamber 18 also increases at the same time as the diaphragm 17 is contracted.

Then, when the piston rod 13 is expanded as in FIG. 4, a volume of the lower chamber 11b increases. While the contracted diaphragm 17 is expanded by the pressure in the high-pressure gas chamber 18 to pressure the oil in the support chamber 16. Accordingly, the oil in the support chamber 16 flows into the oil flow space 13a of the piston rod 13 through the pipe member 19 and flows into the lower chamber 11b through the oil passage 15a of the partition wall 15 at the same time.

At this time, a force pushing the piston 12 upward in the lower chamber 11b and a force pushing the piston rod 13 upward in the oil flow space 13a are added, and accordingly, the piston rod 13 is moved upward promptly.

Thus, in a normal situation where a height of the vehicle is neither raised nor lowered, the shock absorber according to an exemplary embodiment of the present invention can absorb vibrations, thereby improving riding quality and adjustment stability.

Figure 5:
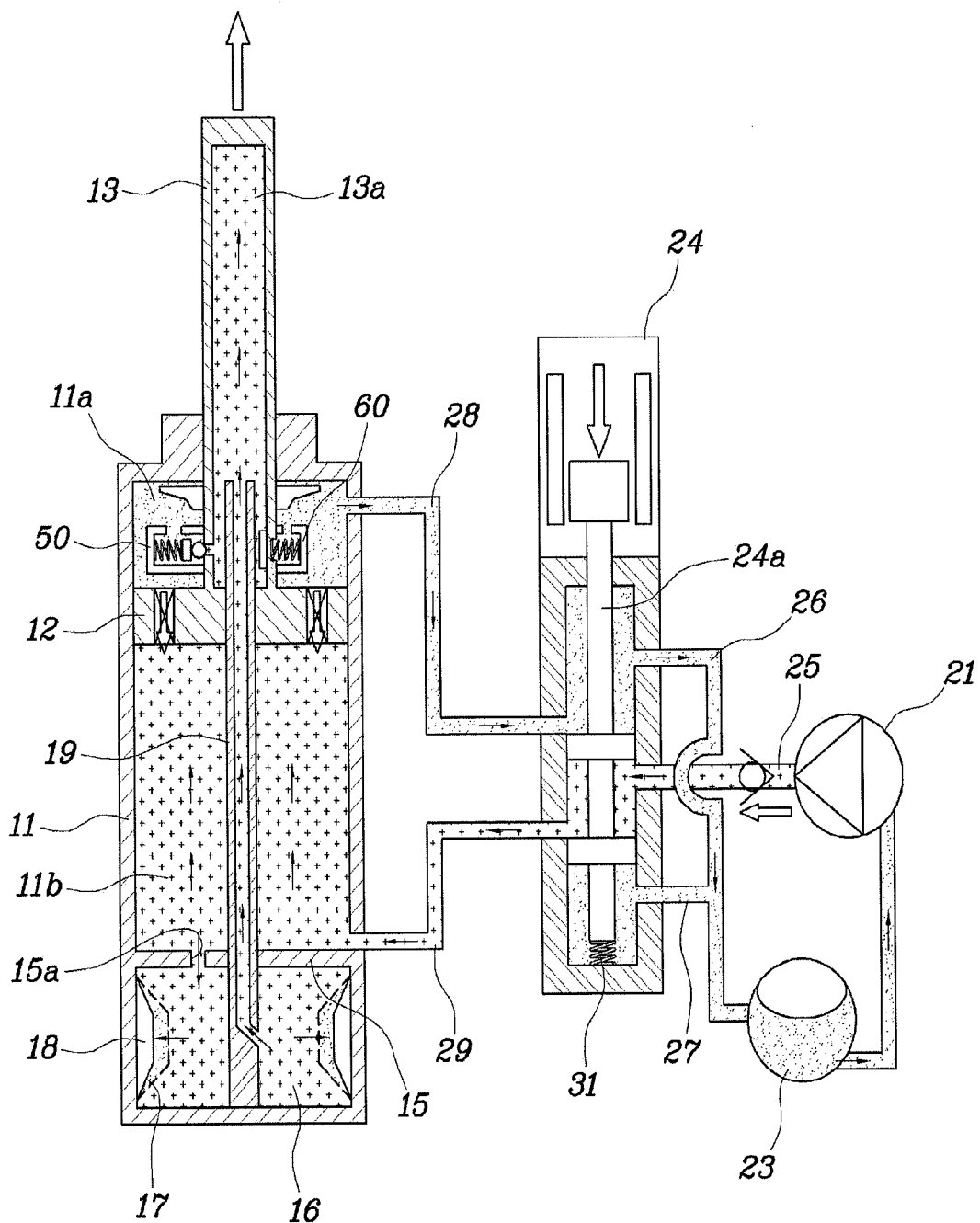
FIG. 5 is a view of a state where a height of the vehicle is raised.

FIG. 5 illustrates a state where a height of the vehicle is raised, and a rebound side shock absorber during a straight travel of the vehicle and an outer turn wheel side shock absorber during a turn of the vehicle correspond thereto.

Then, the oil pump 21 is operated and the spool 24a of the solenoid valve 24 is lowered while overcoming a force of the solenoid valve spring 31, and accordingly, the supply pipe line 25 and the second valve pipe line 29 are connected to each other and the first return pipe line 26 and the first valve pipe line 28 are connected to each other.

As illustrated in FIG. 3, the pressure-type relief valve 50 and the pressure-type check valve 60 keep blocking the first and second rod passages 13b and 13c, respectively.

The oil is introduced into the lower chamber 11b of the cylinder 11 through the supply pipe line 25 and the second valve pipe line 29 due to an operation of the oil pump 21, and some of the oil introduced into the lower chamber 11b pushes a lower portion of the piston 12 to move the piston 12 upward and the remaining oil is introduced into the support chamber 16 through the oil passage 15a and then flows into the oil flow space 13a of the piston rod 13 through the pipe member 19 again.

Thus, a force pushing the piston 12 upward within the lower chamber 11b of the cylinder 11 and a force pushing the piston rod 13 upward within the oil flow space 13a are added to promptly move the piston 12 upward. As a result, the shock absorber according to an exemplary embodiment of the present invention always maintains a height of the vehicle variously changing during a travel of the vehicle constantly and stably.

Figure 6:
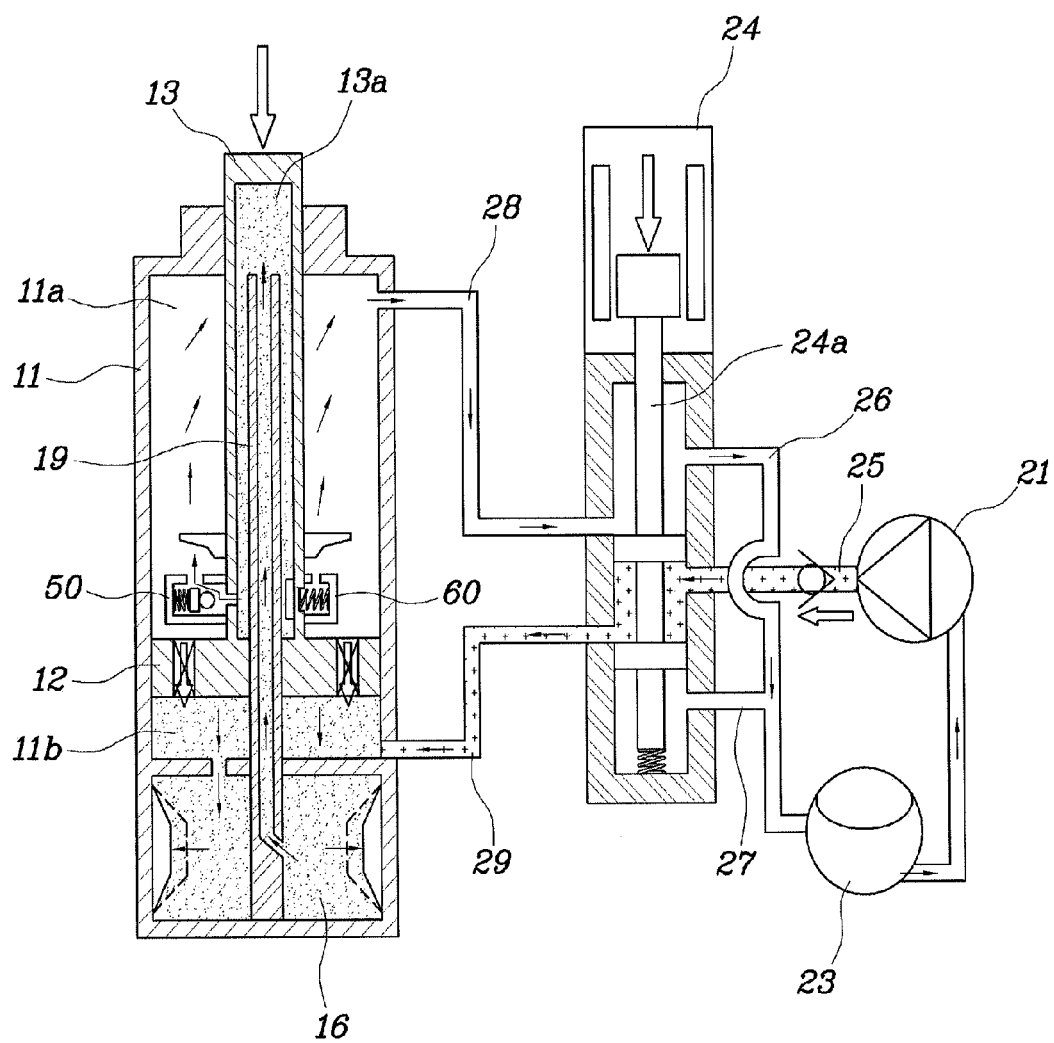
FIG. 6 is a view of a state where a bump occurs while a height of the vehicle is raised.
Figure 7:
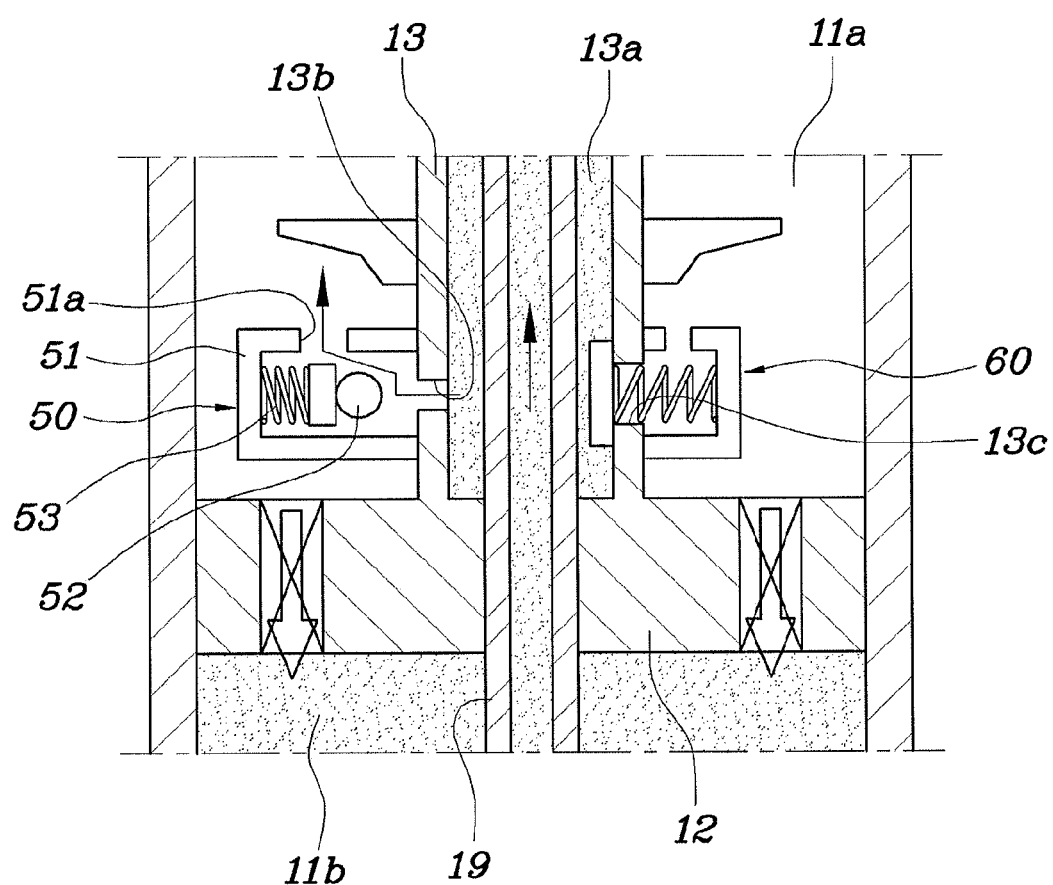
FIG. 7 is an enlarged view of a portion of FIG. 6 to which a valve mechanism is mounted.

FIG. 6 illustrates a state where a bump occurs while a height of the vehicle is raised, and then the piston 12 is lowered.

As a bump occurs while a height of the vehicle is raised, if the piston 12 is lowered, the oil pressure in the oil flow space 13a primarily increases while the height of the vehicle is raised as in FIG. 5 and as the pressure in the support chamber 16 is increased by the piston 12 lowered when a bump occurs as in FIG. 6 the oil pressure in the oil flow space 13a secondarily increases additionally.

Thus, while the pressure-type check valve 60 installed in the piston rod 13 keeps closing the second rod passage 13c, the pressure-type relief valve 50 is moved to the inner side of the relief valve housing 51 while the relief valve member 52 overcomes a force of the relief valve spring 53. Accordingly, the fluid flow space 13a of the cylinder rod 13 is connected to the upper chamber 112a of the cylinder 11 through the first rod passage 13b and the relief valve passage 51a, and the oil in the fluid flow space 13a returns to the accumulator 23 through the upper chamber 11a via the first valve pipe line 28 and the first return pipe line 28.

That is, the shock absorber according to an exemplary embodiment of the present invention improves riding quality, improves adjustment stability, always maintains a height of the vehicle constantly and stably, and improves durability as the pressure-type relief valve 50 installed in the piston rod 13 does not perform an opening operation against the high pressure generated by an operation of the oil pump 21 and performs an opening operation only in a situation where an additional pressure is generated within the oil flow space 13a when a bump occurs while a height of the vehicle is raised.

Figure 8:
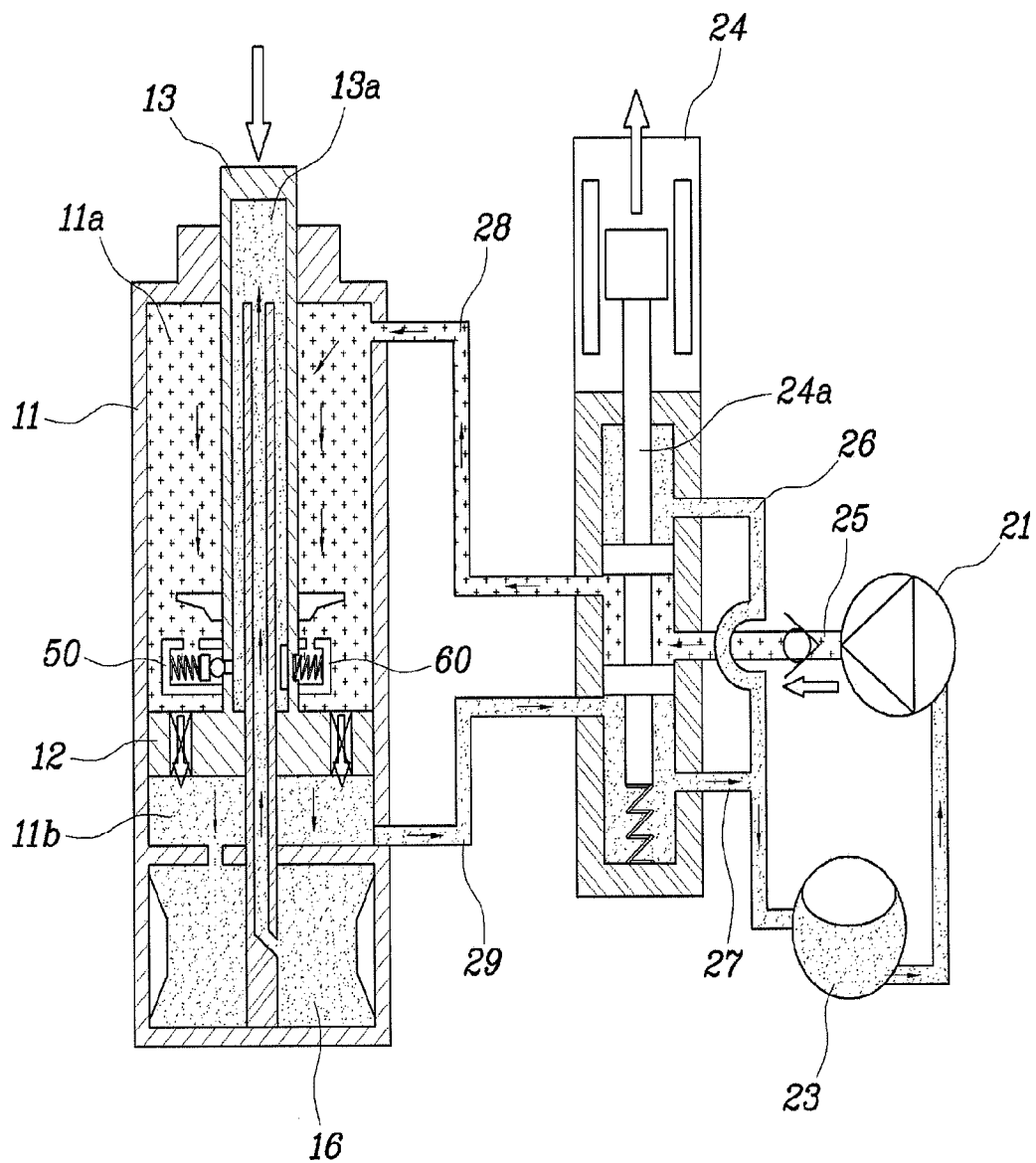
FIG. 8 is a view of a state where a height of the vehicle is lowered.

FIG. 8 illustrates a state where a height of the vehicle is lowered, and a bump side shock absorber during a straight travel of the vehicle and an inner turn wheel side shock absorber during a turn of the vehicle correspond thereto.

At this time, the oil pump 21 is operated and the spool 24a of the solenoid valve 24 is raised. Accordingly, the supply pipe line 25 and the first valve pipe line 28 are connected to each other, and the second return pipe line 27 and the second valve pipe line 29 are connected to each other.

As illustrated in FIG. 3, the pressure-type relief valve 50 and the pressure-type check valve 60 keep blocking the first and second rod passages 13b and 13c, respectively.

If the oil is introduced into the upper chamber 11a of the cylinder 11 through the supply pipe line 25 and the first valve pipe line 28 due to an operation of the oil pump 21, the piston 12 is lowered by the oil pressure in the upper chamber 11a. At this time, the oil in the lower chamber 11b of the cylinder 11 returns to the accumulator 23 through the second valve pipe line 29 and the second return pipe line 27.

Thus, the shock absorber according to an exemplary embodiment of the present invention always maintains a height of the vehicle variously changing when a height of the vehicle is lowered, constantly and stably.

Figure 9:
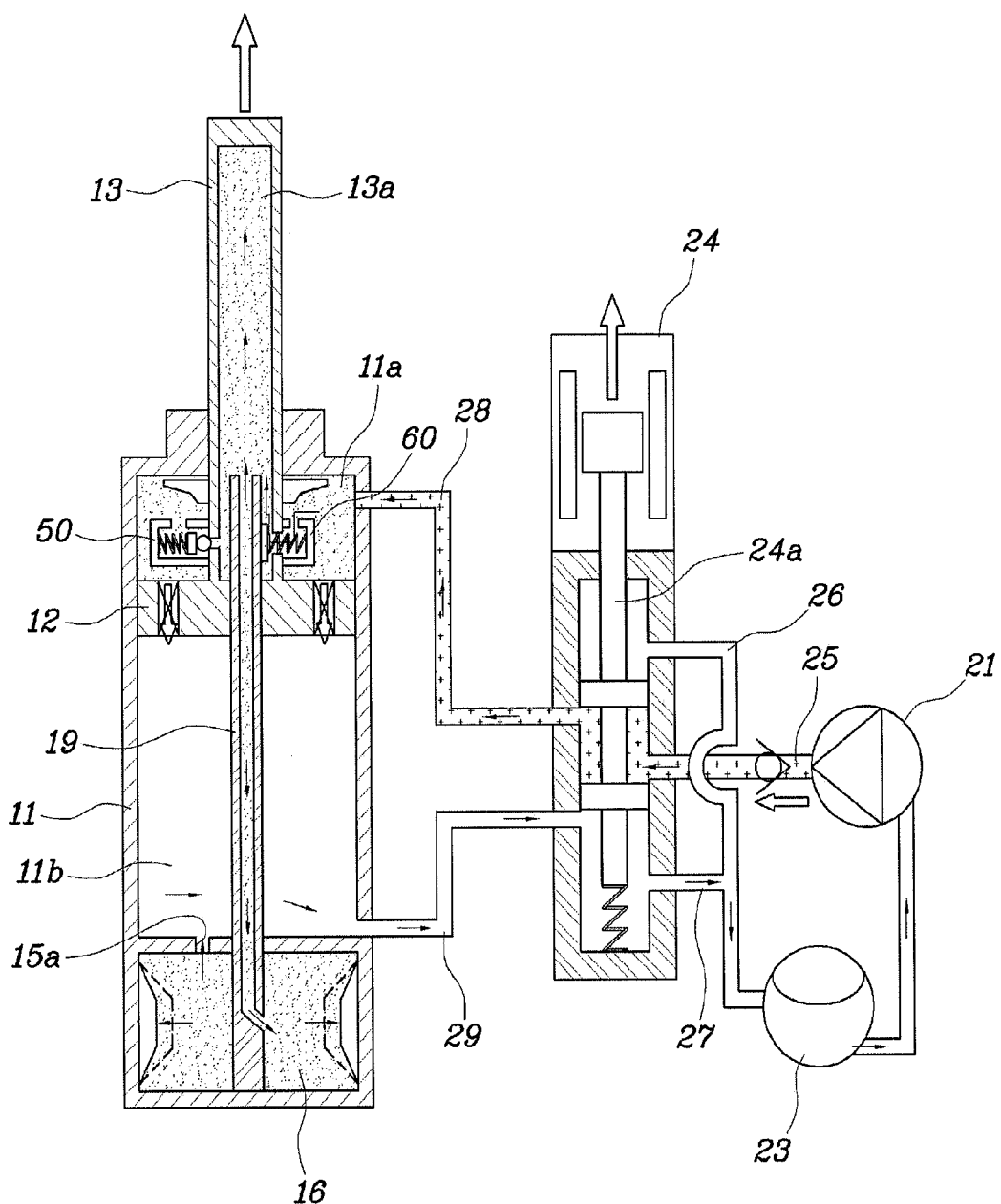
FIG. 9 is a view of a state where a rebound occurs while a height of the vehicle is lowered.

FIG. 9 illustrates a state where a rebound occurs while a height of the vehicle is lowered, and then the piston 12 is raised.

As a rebound occurs while a height of the vehicle is lowered, if the piston 12 is raised, the oil pressure in the upper chamber 11a primarily increases while the height of the vehicle is lowered as in FIG. 8 and as the pressure in the upper chamber 11a is increased by the piston 12 raised when a rebound occurs as in FIG. 9, the oil pressure in the upper chamber 11a secondarily increases additionally.

Figure 10:
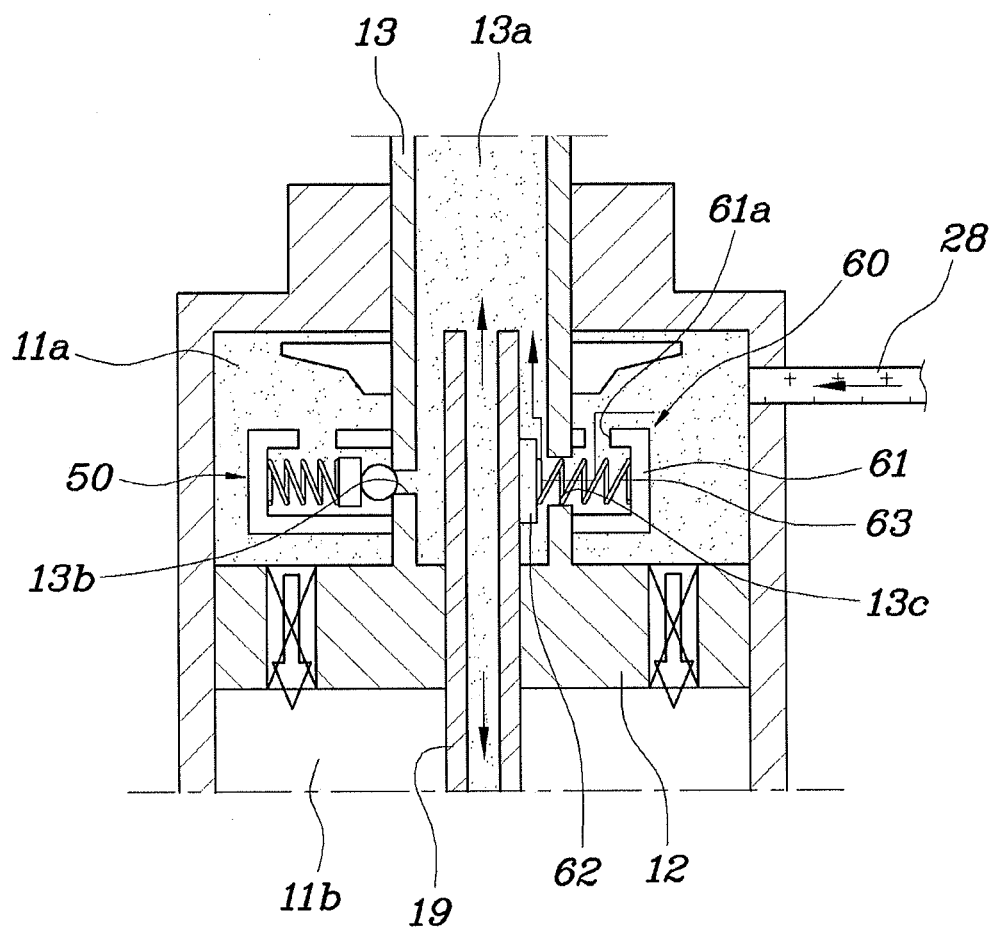
FIG. 10 is an enlarged view of a portion of FIG. 9 to which a valve mechanism is mounted.

Thus, while the pressure-type relief valve 50 installed in the piston rod 13 continuously closes the first rod passage 13b as in FIG. 10, the check valve member 62 of the pressure-type check valve 60 overcomes a force of the check valve spring 63 due to the additional pressure of the oil generated in the upper chamber 11a to flow into the oil flow space 13a. Accordingly, the upper chamber 11a of the cylinder 11 is connected to the fluid flow space 13a of the cylinder rod 13 through the check valve passage 61a and the second rod passage 13c.

As described above, if the upper chamber 11a of the cylinder 11 and the fluid flow space 13a of the cylinder rod 13 are connected to each other, the oil introduced into the upper chamber 11a flows into the fluid flow space 13a through the first valve pipe line 28, the oil having flowed into the fluid flow space 13a flows into the support chamber 16 through the pipe member 19 and then flows into the lower chamber 11b of the cylinder, and the oil in the lower chamber 11b returns to the accumulator 23 through the second valve pipe line 29 and the second return pipe line 27.

Thus, the shock absorber according to an exemplary embodiment of the present invention improves riding quality, improves adjustment stability, always maintains a height of the vehicle constantly and stably, and improves durability as the pressure-type check valve 60 installed in the piston rod 13 does not perform an opening operation against the high pressure generated by an operation of the oil pump 21 and performs an opening operation only in a situation where an additional pressure is generated within the upper chamber 11a of the cylinder 11 when a rebound occurs while a height of the vehicle is lowered.

As described above, the shock absorber according to an exemplary embodiment of the present invention improves riding quality, improves adjustment stability, and always maintains a height of the vehicle constantly and stably by using the monotube-type cylinder 11 when a height of the vehicle is adjusted, which is advantageous in a layout of the vehicle according to reduction of weight due to reduction of size, reduction of manufacturing costs, and securing an installation space.

While the twin tube-type shock absorber using an inner tube and an outer tube employs a separate valve member for interrupting a passage between an inner tube and an outer tube, the shock absorber according to an exemplary embodiment of the present invention eliminates an necessary valve member with a construction using the monotube-type cylinder 11, thereby reducing the number of parts, reducing weight, and reducing manufacturing costs.

As described above, the shock absorber according to an exemplary embodiment of the present invention improves riding quality, improves adjustment stability, and always maintains a height of the vehicle constantly and stably by using the monotube-type cylinder when a height of the vehicle is adjusted, which is advantageous in a layout of the vehicle according to reduction of weight due to reduction of size, reduction of manufacturing costs, and securing an installation space.

While the invention will be described in conjunction with an exemplary embodiment, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A shock absorber apparatus for a vehicle, comprising:
    a piston installed within a cylinder to be moved along a lengthwise direction of the cylinder and separating the cylinder into an upper chamber and a lower chamber;
    a piston rod installed to pass through the cylinder and connected to the piston, wherein the piston rod has an oil flow space therein;
    a valve mechanism installed on the piston rod and operated to be opened and closed to selectively connect the upper chamber of the cylinder and the oil flow space of the piston rod;
    a support chamber formed under the lower chamber of the cylinder by a partition wall and fluid-connected to the lower chamber through an oil passage formed to the partition wall;
    a high-pressure gas chamber formed within the support chamber and partitioned from the support chamber by a diaphragm; and
    a pipe member passing through the piston and installed to fluid-connect the oil flow space of the piston rod and the support chamber.

2. The shock absorber apparatus of claim 1, wherein the cylinder is a monotube-type cylinder.

3. The shock absorber apparatus of claim 1, further comprising:
    an oil pump for generating a hydraulic pressure;
    an accumulator storing an oil and installed to be connected to the oil pump via a connecting pipe line;
    a solenoid valve including a spool selectively slid in accordance with a controller;
    a supply pipe line connecting the oil pump and the solenoid valve;
    a first return pipe line and a second return pipe line connecting the accumulator and the solenoid valve; and
    a first valve pipe line connecting the upper chamber of the cylinder and the solenoid valve and a second valve pipe line connecting the lower chamber of the cylinder and the solenoid valve,
    wherein the first valve pipe line or the second valve pipe line is selectively connected to the oil pump or the accumulator by the movement of the spool.

4. The shock absorber apparatus of claim 1, wherein the valve mechanism includes:
    a pressure-type relief valve installed on the piston rod and operated to open a first rod passage formed to the piston rod to fluid-connect the upper chamber of the cylinder and the oil flow space of the piston rod when a bump occurs while a height of the vehicle is raised in a situation where a hydraulic pressure is supplied to the lower chamber of the cylinder; and
    a pressure-type check valve installed on the piston rod and operated to open a second rod passage to connect the upper chamber of the cylinder and the oil flow space of the piston rod when a rebound occurs while a height of the vehicle is lowered in a situation where a hydraulic pressure is supplied to the upper chamber of the cylinder.

5. The shock absorber apparatus of claim 4, wherein the pressure-type relief valve includes:

a relief valve housing connected to the piston rod to protrude toward the upper chamber, and having a relief valve passage fluid-connected to the upper chamber;

a relief valve member located within the relief valve housing to open and close the first rod passage; and a relief valve spring installed such that one end thereof is supported by the relief valve housing and an opposite end thereof is supported by the relief valve member and configured to provide a resilient force to the relief valve member such that the relief valve member is elastically biased to close the first rod passage.

6. The shock absorber apparatus of claim 5, wherein a resilient force of the relief valve spring applied to the relief valve member in a situation where the relief valve member closes the first rod passage is larger than an oil pressure applied from the oil flow space to the relief valve member in a situation where a hydraulic pressure is not supplied to the cylinder and an oil pressure applied from the oil flow space to the relief valve member when a height of the vehicle is raised in a situation where a hydraulic pressure is supplied to the lower chamber of the cylinder, and is smaller than an oil pressure applied from the oil flow space to the relief valve member when a bump occurs while a height of the vehicle is raised in a situation where a hydraulic pressure is supplied to the lower chamber of the cylinder.

7. The shock absorber apparatus of claim 4, wherein the pressure-type check valve includes:

a check valve housing connected to the piston rod to protrude toward the upper chamber, and having a check valve passage fluid-connected to the upper chamber;

a check valve member located within the oil flow space of the piston rod to open and close the second rod passage; and a check valve spring installed such that one end thereof is supported by the check valve housing and an opposite end thereof is supported by the check valve member and configured to provide a resilient force to the check valve member such that the check valve member is elastically biased to close the second rod passage.

8. The shock absorber apparatus of claim 7, wherein a resilient force of the check valve spring applied to the check valve member in a situation where the check valve member closes the second rod passage is larger than an oil pressure applied to the check valve member within the check valve housing in a situation where a hydraulic pressure is not supplied to the cylinder and an oil pressure applied to the check valve member within the check valve housing when a height of the vehicle is lowered in a situation where a hydraulic pressure is supplied to the upper chamber of the cylinder, and is smaller than an oil pressure applied to the check valve member within the check valve housing when a rebound occurs while a height of the vehicle is lowered in a situation where a hydraulic pressure is supplied to the upper chamber of the cylinder.

9. The shock absorber apparatus of claim 1, wherein an orifice is installed in the piston.

\* \* \* \* \*

UNITED STATES PATENT AND TRADEMARK OFFICE
CERTIFICATE OF CORRECTION

| | | Page 1 of 1 |
|---|---|---|
| PATENT NO. | : 8,573,606 B1 | |
| APPLICATION NO. | : 13/710292 | |
| DATED | : November 5, 2013 | |
| INVENTOR(S) | : Bo Min Kim et al. | |

It is certified that error appears in the above-identified patent and that said Letters Patent is hereby corrected as shown below:

On the title page insert item (30) Foreign Application Priority Data:

--May 22, 2012 (KR) ..................... 10-2012-0054144--

Signed and Sealed this
Eleventh Day of February, 2014

Michelle K. Lee
*Deputy Director of the United States Patent and Trademark Office*